United States Patent
Ranjekar

(10) Patent No.: US 9,450,824 B2
(45) Date of Patent: Sep. 20, 2016

(54) SYSTEMS AND METHODS FOR SMART REQUEST PROCESSING

(71) Applicant: Abhijit Shrikant Ranjekar, Pune (IN)

(72) Inventor: Abhijit Shrikant Ranjekar, Pune (IN)

(73) Assignee: WIPRO LIMITED, Bangalore (IN)

( * ) Notice: Subject to any disclaimer, the term of this patent is extended or adjusted under 35 U.S.C. 154(b) by 302 days.

(21) Appl. No.: 14/229,797

(22) Filed: Mar. 28, 2014

(65) Prior Publication Data
US 2015/0222487 A1 Aug. 6, 2015

(30) Foreign Application Priority Data

Feb. 4, 2014 (IN) .............................. 525/CHE/2014

(51) Int. Cl.
H04L 12/24 (2006.01)
H04L 29/06 (2006.01)

(52) U.S. Cl.
CPC ......... *H04L 41/0836* (2013.01); *H04L 41/083* (2013.01); *H04L 63/083* (2013.01)

(58) Field of Classification Search
CPC H04L 41/0836; H04L 63/083; H04L 41/083
See application file for complete search history.

(56) References Cited

U.S. PATENT DOCUMENTS

| | | | |
|---|---|---|---|
| 7,523,190 B1 | 4/2009 | Bickerstaff et al. | |
| 2006/0271641 A1* | 11/2006 | Stavrakos | G06F 17/30902 709/217 |
| 2009/0307603 A1* | 12/2009 | Gowda | H04L 67/2823 715/749 |
| 2010/0131630 A1* | 5/2010 | Kondamuru | G06F 9/5083 709/222 |
| 2010/0318426 A1* | 12/2010 | Grant | G06F 17/30864 705/14.66 |
| 2011/0047287 A1* | 2/2011 | Harrang | H04L 45/00 709/235 |
| 2012/0060079 A1 | 3/2012 | Hawkins | |
| 2012/0284767 A1* | 11/2012 | Hockings | H04L 63/20 726/1 |
| 2013/0051257 A1* | 2/2013 | Pappas | H04L 47/00 370/252 |
| 2014/0369249 A1* | 12/2014 | Mikhailov | H04W 4/06 370/312 |

FOREIGN PATENT DOCUMENTS

WO WO 2010/094927 A1 8/2010

OTHER PUBLICATIONS

Arthur Allen, "Optimal Delivery of Multi-Media Content over Networks", 2001, ACM, pp. 79-88.*
Shin et al., "Optimizing Web Content Delivery using Web Accelerator", 2002, Australian Computer Science Conference, pp. 233-239.*

(Continued)

*Primary Examiner* — Matthew Smithers
(74) *Attorney, Agent, or Firm* — Finnegan, Henderson, Farabow, Garrett & Dunner LLP

(57) ABSTRACT

This disclosure relates generally to compensating for the impact of fluctuations in network communications and, more particularly, to systems and methods for optimizing transmission of web content. In one embodiment, a web content transmission optimization method is disclosed that includes receiving a request to transmit web content. The method may also include identifying, based on the request, a response that includes one or more response objects corresponding to the web content. The method may further include restructuring, by one or more processors, the response based on one or more configuration parameters. The method also comprises scheduling the restructured response and transmitting the requested web content according to the scheduled restructured response.

40 Claims, 10 Drawing Sheets

(56) References Cited

OTHER PUBLICATIONS

Xu et al., "Personalized Web Content Provider Recommendation through Mining Individual Users' QoS", 2009, ACM, pp. 89-98.*

D'Antonio et al., "Pinball Caching: Improving Performance of a Framework for Dynamic Web-Content Adaptation and Delivery", 2006, IEEE, pp. 1-6.*

* cited by examiner

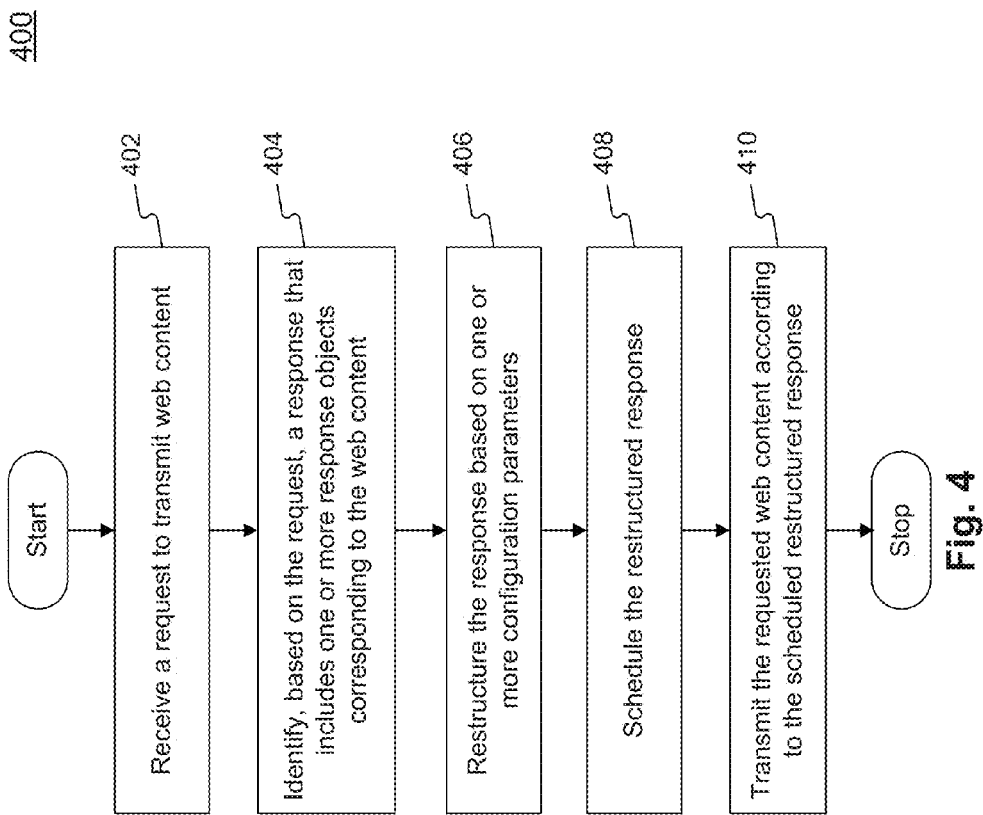

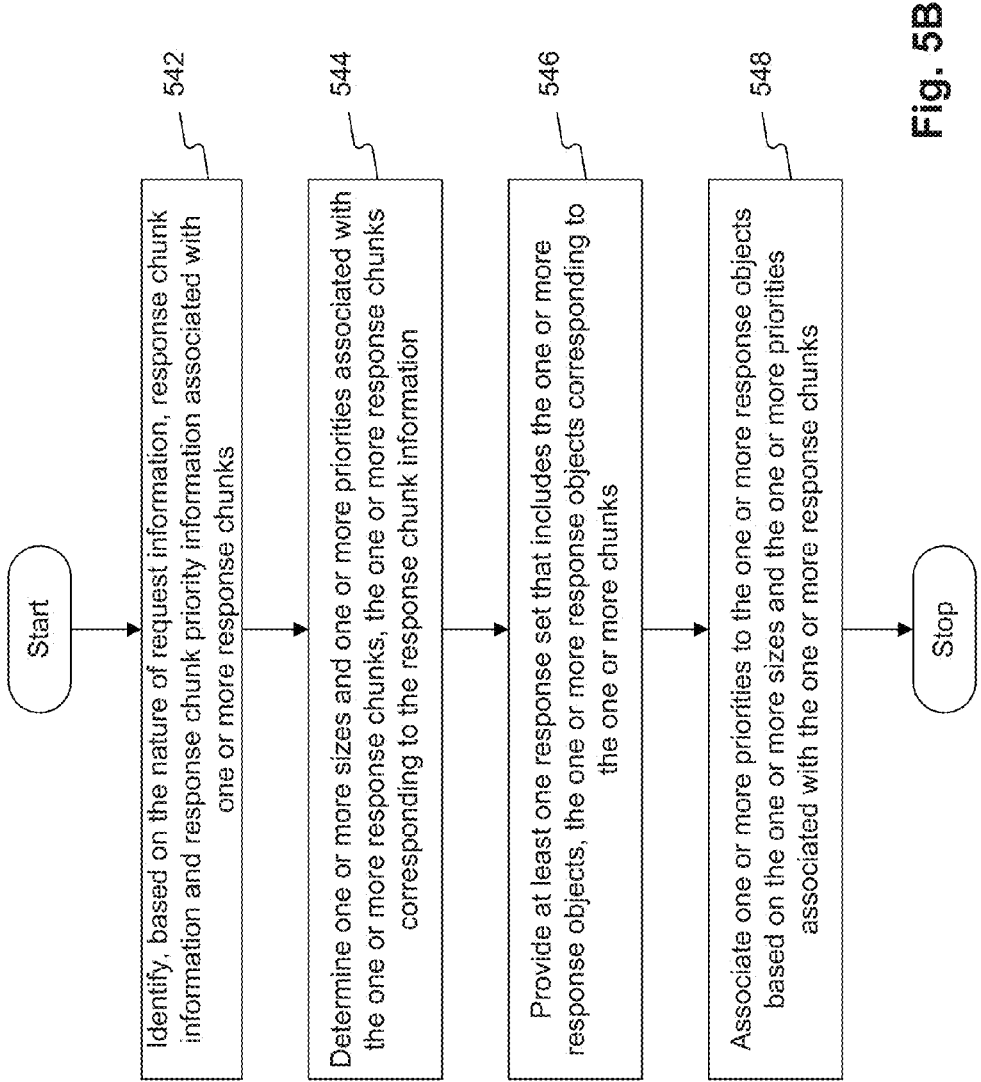

SYSTEMS AND METHODS FOR SMART REQUEST PROCESSING

PRIORITY CLAIM

This U.S. patent application claims priority under 35 U.S.C. §119 to India Patent Application No. 525/CHE/2014, filed on Feb. 4, 2014. The aforementioned application is incorporated herein by reference in its entirety.

TECHNICAL FIELD

This disclosure relates generally to compensating for the impact of fluctuations in network communications and, more particularly, to systems and methods for optimizing transmission of web content.

BACKGROUND

Internet has become an essential requirement for operating organizations and businesses. Internet users consume a variety of services online, including accessing websites and Universal Resource Locators (URLs). A user may use a variety of devices, including wired or wireless devices, to access websites. Moreover, the network connectivity may vary depending on whether the user access the Internet through an Local Area Network (LAN), a Wide Area Network (WAN), or Wireless connections, such as a WiFi network or a cellular mobile network. The network connectivity sometimes may also depend on the particular service providers, the dynamic conditions of the network (such as, e.g., traffic congestion), and other factors that may affect the efficiency of the network (such as, e.g., weather, physical location, etc.). Moreover, a user may request different contents which have different importance to the user. For example, a user may request an online banking transaction and a bank statement. And understanding the status/progress of completion of the online banking transaction may be more important to the user than obtaining the regular bank statement. As another example, processing transactions requested by a high-worth customer or involving a high-value item for sale may be more important from the perspective of business than those low-worth or low-value transactions.

When a user requests access to websites and URLs, webservers facilitate the interactions with the users by providing the requested content. A typical webserver provides limited and static choices for switching between a variety of responses based on the type of user devices and the network connectivity. For example, a typical webserver provides responses in the sequence of receiving the requests. In providing the response, the webserver may not have knowledge of the user's connectivity and any changing conditions of the available communication channel, the importance of the content, or the preferences of the user (if any). For example, the webserver may not be able to provide an optimized response due to various dynamic conditions including delays caused by the network systems within a data center, delays caused by the network connectivity outside of the data center, the volume of the requested content, and the nature of content based on the user's request. Therefore, due to these various dynamic conditions, a typical webserver may not provide the response in a desired manner. The user's experience may thus be degraded.

SUMMARY

In one embodiment, a web content transmission optimization method is disclosed, comprising: receiving a request to transmit web content. The method may also include identifying, based on the request, a response that includes one or more response objects corresponding to the web content. The method may further include restructuring, by one or more processors, the response based on one or more configuration parameters. The method may also comprise scheduling the restructured response and transmitting the requested web content according to the scheduled restructured response.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a flow diagram illustrating an exemplary method for optimizing transmission of web content, consistent with some embodiments of the present disclosure.

FIG. 5B is a flow diagram illustrating an exemplary method for restructuring the response based on the nature of request information and a level of restructuring, consistent with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
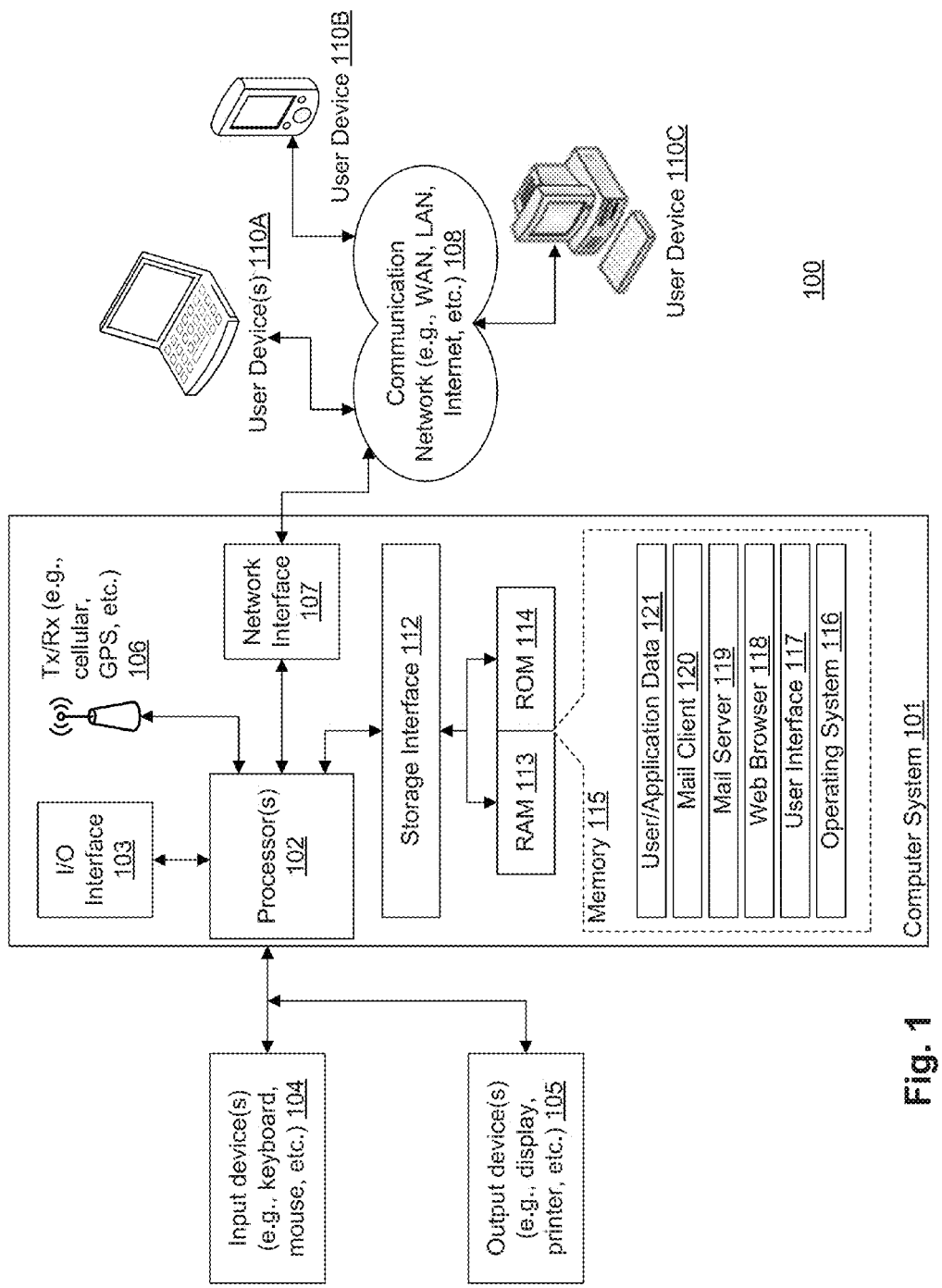
FIG. 1 illustrates an exemplary network system, according to some embodiments of the present disclosure.

FIG. 1 is a block diagram of an exemplary network system 100 for implementing embodiments consistent with the present disclosure. Variations of computer system 101 may be used for implementing a server, such as a content server, a proxy server, a webserver, a desktop computer, a server farm, etc. Computer system 101 may comprise one or more central processing units ("CPU" or "processor") 102. Processor 102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 102 may be disposed in communication with one or more input/output (I/O) devices via I/O interface 103. I/O interface 103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 103, computer system 101 may communicate with one or more I/O devices. For example, input device 104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 105 may be a printer, fax machine, video display (e.g., cathode ray tube (CRT), liquid crystal display (LCD), light-emitting diode (LED), plasma, or the like), audio speaker, etc. In some embodiments, a transceiver 106 may be disposed in connection with the processor 102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 102 may be disposed in communication with a communication network 108 via a network interface 107. Network interface 107 may communicate with communication network 108. Network interface 107 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 108 may include, without limitation, a direct interconnection, local area network (LAN), wide area network (WAN), wireless network (e.g., using Wireless Application Protocol), the Internet, etc. Using network interface 107 and communication network 108, computer system 101 may communicate with devices 110A-C (collectively "user devices 110"). These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 101 may itself embody one or more of these devices.

Figure 3:
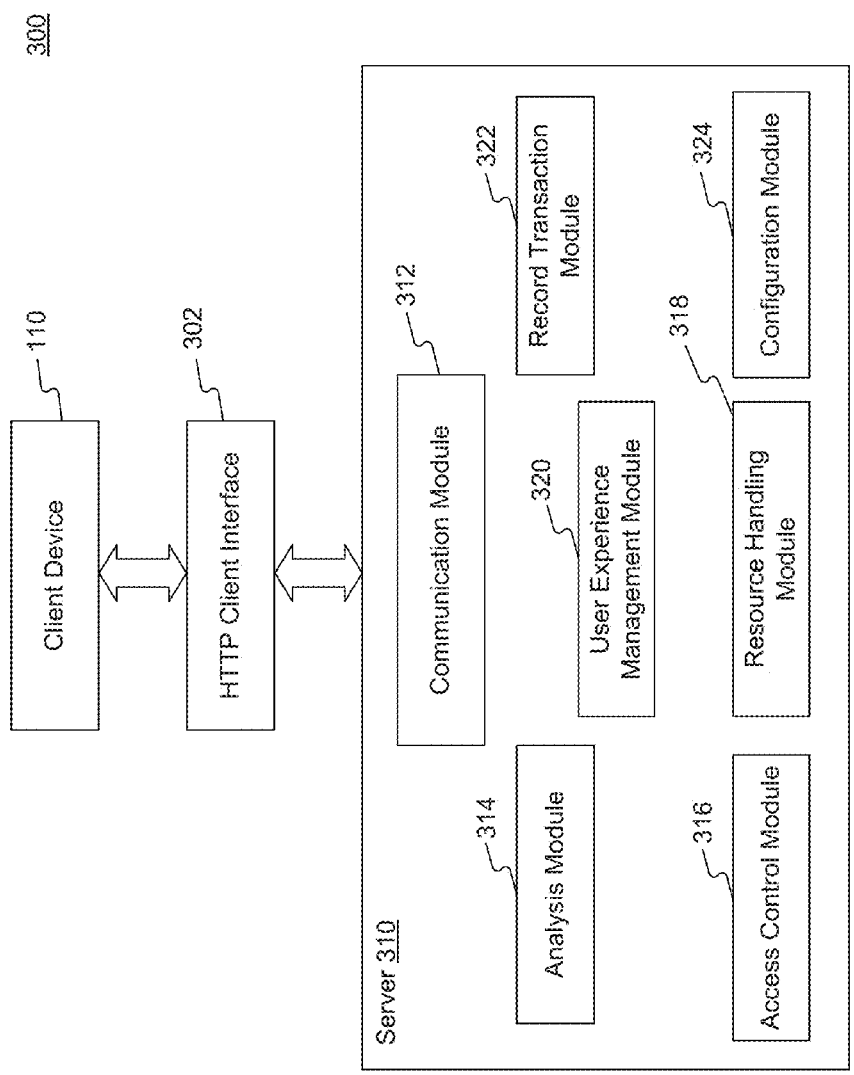
FIG. 3 is an exemplary functional block diagram of a system for optimizing transmission of web content, according to some embodiments of the present disclosure.

In some embodiments, processor 102 may be disposed in communication with one or more memory devices (e.g., RAM 113, ROM 114, etc.) via a storage interface 112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, one or more modules, such as record transaction module 322 and configuration module 324, as shown in FIG. 3.

The memory devices may store a collection of program or database components, including, without limitation, an operating system 116, user interface application 117, web browser 118, mail server 119, mail client 120, user/application data 121 (e.g., any data variables or data records discussed in this disclosure), etc. Operating system 116 may facilitate resource management and operation of computer system 101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 117 may facilitate display, execution, interaction, manipulation, or operation of program components through textual or graphical facilities. For example, user interfaces may provide computer interaction interface elements on a display system operatively connected to computer system 101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 101 may implement a web browser 118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 101 may implement a mail server 119 stored program component. Mail server 119 may be an Internet mail server such as Microsoft Exchange, or the like. Mail server 119 may utilize facilities such as ASP, ActiveX, ANSI C++/C#, Microsoft .NET, CGI scripts, Java, JavaScript, PERL, PHP, Python, WebObjects, etc. Mail server 119 may utilize communication protocols such as internet message access protocol (IMAP), messaging application programming interface (MAPI), Microsoft Exchange, post office protocol (POP), simple mail transfer protocol (SMTP), or the like. In some embodiments, computer system 101 may implement a mail client 120 stored program component. Mail client 120 may be a mail viewing application, such as Apple Mail, Microsoft Entourage, Microsoft Outlook, Mozilla Thunderbird, etc.

In some embodiments, computer system 101 may store user/application data 121, such as the data, variables, records, etc. (e.g., record of transactions, response objects, response chunks) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for smart request processing. The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Figure 2:
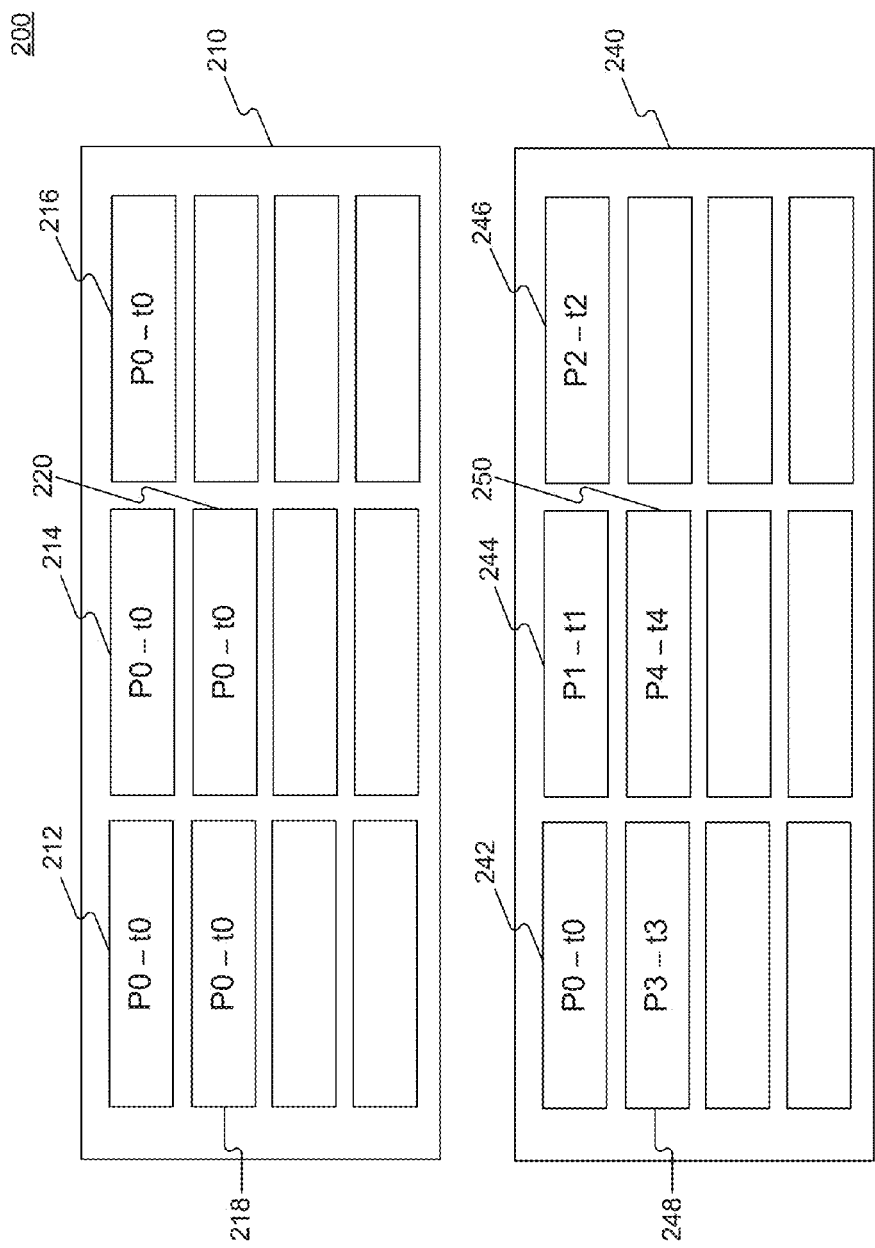
FIG. 2 is a block diagram illustrating the elements and the delivery manner of the webpage contents of a response that a typical webserver transmits to a user device.

FIG. 2 is a block diagram illustrating the elements and the delivery manners of the webpage contents of a response 200 that a typical webserver transmits to a user device. As shown in FIG. 2, a response 200 represents contents corresponding to two webpages (e.g., webpage contents 210 and webpage contents 240), illustrating two different delivery manners of the webpages contents. The two webpage contents include a plurality of content elements. For example, webpage contents 210 includes content elements 212, 214, 216, 218, and 220. Webpage contents 240 includes content elements 242, 244, 246, 248, and 250.

In transmitting webpage contents 210, a typical server, such as a content server or a web server, may divide webpage contents 210 into elements in a standard manner, and transmit the elements as they are prepared and ready for transmission. For example, in one scenario, a typical content and/or web server treats content elements 212, 214, 216, 218, and 220 with the same priority and transmits them once they are ready (e.g., effectively all content elements of webpage contents 210 have the same priority and timestamp P0-t0, at which time the elements are required to be delivered). In another scenario, for transmitting webpage contents 240, the typical content and/or web server divides webpage contents 240 into elements in a standard manner, and simply transmits the elements sequentially. For example, a typical content and/or web server transmits content elements 242, 244, 246, 248, and 250 sequentially. In other words, the typical content and/or web server effectively sets the priorities of the content elements and schedules the delivery in a serial or linear manner (e.g., the content elements of webpage contents 240 have linear priorities and timestamps, such as P0-t0, P1-t1, P2-t2, P3-t3, P4-t4, etc.).

Because the typical content and/or web server either does not set any priority and/or schedule the delivery, or sets the priority and schedules the delivery in a serial or linear manner, the typical content and/or web server transmits webpages contents in the same manner regardless of the user's preferences, business requirements, or network conditions. Thus, under many circumstances, a typical content and/or web server may not respond to user's request in a well-structured way, as desired by the user and/or the business.

FIG. 3 is an exemplary functional block diagram of a system 300 for optimizing transmission of web content, according to some embodiments of the present disclosure. With reference to FIG. 3, in some embodiments, system 300 may include a server 310, a client device 110, and an HTTP client interface 302. Server 310 may include a communication module 312, an analysis module 314, an access control module 316, a resource handling module 318, a user experience management module 320, a record transaction module 322, and a configuration module 324.

As described above, server 310 may be implemented by, for example, computer system 101. Server 310 can communicate with one or more client devices (e.g., client devices 110) either directly or indirectly. For example, server 310 can communicate with client devices 110 directly or via HTTP client interface 302. HTTP client interface 302 can be a software program and/or a hardware device.

With reference to FIG. 3, in some embodiments, communication module 312 may receive an HTTP request from client device 110 via HTTP client interface 302. An HTTP request may include a request for accessing one or more particular resources, such as a webpage. Communication module 312 may also obtain information associated with a referral URL using the request. A referral URL is a URL of the previous webpage that client device 110 requested. For example, when a user clicks on a link in a webpage, the browser of client device 110 can move to the specified link that the user clicked. When client device 110 sends the request of the new webpage, it may also send the URL of the previous webpage that contains the link of the new webpage. This URL of the previous webpage is sometimes referred to as a referral URL.

In some embodiments, using this information associated with a referral URL, communication module 312 may determine if any of the previous requests correspond to the current request. If communication module 312 determines that one or more previous requests correspond to the current request, one or more response objects corresponding to the previous request may not be required for transmission because they may be no longer relevant to the browser of client device 110. Response objects may be a server's internal representations of a response, and is further described below.

After communication module 312 determines that one or more previous requests correspond to the current request, communication module 312 may mark the one or more response objects for cancellation of transmission. In some embodiments, by marking the one or more response objects for cancellation, communication module 312 may not provide the part of the HTTP request (e.g., one or more request objects) that corresponds to the one or more previous requests to analysis module 314 for further processing. For example, communication module 312 may process or otherwise transform an HTTP request to a plurality of request objects. If some of the request objects correspond to the one or more previous requests, communication module 312 may not provide those request objects to analysis module 314.

In some embodiments, in responding to an HTTP request, communication module 312 may transmit one or more responses to client device 110 directly or indirectly. The responses may be restructured responses. Communication module 312 may schedule the transmission of the one or more restructured responses based on a plurality of parameters, such as parameters related to the nature of request, the availability of communication channel, the priorities of response sets, the priorities of response objects within a response set, the priorities of response chunks within a response object, etc. Restructuring of the response is further described in detail below.

After scheduling the transmission, communication module 312 may transmit the restructured responses to client devices 110 based on the schedule. In some embodiments, communication module 312 may also facilitate independent transmission of synthetic responses for the purpose of assessing communication channels (i.e., synthetic/active monitoring). Communication module 312 may also analyze the current request and terminate transmission of one or more responses to the previous requests corresponding to the current request. For example, if a response that corresponds to a current request also corresponds to a previous request, and the response to the previous request has not yet been transmitted, communication module 312 may terminate the transmission of the response to the previous request. Instead, communication module 312 may transmit the response according to the current request. Communication module 312 can be a software program and/or a hardware device.

With reference to FIG. 3, in some embodiments, after communication module 312 provides an HTTP request to analysis module 314, analysis module 314 may analyze the HTTP request to extract a uniform resource identifier (URI) and/or other useful parameters associated with the HTTP request. Analysis module 314 may map the URI to a resource. For example, analysis module 314 may correspond the URI to a resource, such as a filename, a script for executing, an alias to actual resource, and a re-direction target. Analysis module 314 may also map a logical source of the resource to an actual location or path for obtaining that resource. Analysis module 314 can be a software program and/or a hardware device.

With reference to FIG. 3, in some embodiments, after analysis module 314 analyzes the HTTP request, access control module 316 may determine authorization of the HTTP request based on credentials associated with the one or more request objects of the HTTP request. For example, access control module 316 may obtain user credentials or device credentials from the request objects and invoke relevant authentication schemes, such as like Lightweight Directory Access Protocol (LDAP) or windows authentication, to authenticate the user and/or the client device that sends the HTTP request. Based on the credentials, access control module 316 may determine whether permission should be granted to access the requested resources. Access control module 316 can be a software program and/or a hardware device.

With reference to FIG. 3, in some embodiments, after access control module determines authorization of the HTTP request, resource handling module 318 may retrieve the requested web content based on the one or more request objects and/or resource map information. As described above, analysis module 314 may provide resource map information by mapping the URI to a resource, such as a filename, a script for executing, an alias to actual resource, and a re-direction target. Resource handling module 318 may use the one or more request objects and/or such resource map information to obtain the requested web content, such as a file, an output of a script, and information from a process, from appropriate sources. As an example, resource handling module 318 may read a file, execute a script, execute a process, or make an application programming interface (API) call.

Moreover, based on the obtained web content and/or the one or more request objects, resource handling module 318 may also generate one or more response objects, which are internal representation of a response, such as an HTTP response. Using the response objects, resource handling module 318 may provide the corresponding HTTP response to user experience management module 320 for restructuring the response. Resource handling module 318 can be a software program and/or a hardware device.

With reference to FIG. 3, in some embodiments, after user experience management module 320 receives the response from resource handling module 318, it may restructure the response using one or more configuration parameters. In restructuring the response, for example, user experience management module 320 may determine the nature of the HTTP request information using the one or more parameters identified through the HTTP request, such as parameters extracted by analysis module 314. As an example, the nature of the request may indicate that the HTTP request pertains to a highly important transaction such as an online banking request for balance transfer. As another example, the nature of the request may indicate that the HTTP request pertains to a less important operation such as requesting a regular bank statement document.

Moreover, in restructuring the response, user experience management module 320 may also estimate a response delivery time based on the one or more response objects and/or one or more sample contents. Sample contents are contents that have a per-configured size, such as 50 bytes, 10 Kilobytes, 250 Kilobytes, 400 Kilobytes, etc. User experience management module 320 can use the sample contents to estimate the availability of the communication channel. For example, user experience management module 320 can prepare a synthetic response, e.g., a response using the sample contents, to an HTTP request, and measure a time, e.g., a round-trip time, for transmitting the sample contents to client device 110. Using the time for transmitting the sample contents, user experience management module 320 can estimate the availability of the communication channel associated with, for example, client device 110 or a particular user. After estimating the availability of the communication channel, user experience management module 320 may further estimate the response delivery time of the response objects that are to be transmitted in response to the HTTP request.

Furthermore, after estimating the response delivery time of the response objects, user experience management module 320 may also determine a level of restructuring based on the estimated response delivery time and one or more response delivery time thresholds. For example, user experience management module 320 may obtain one or more response delivery time thresholds from configuration module 324. User experience management module 320 may compare the estimated response delivery time of the response objects with the one or more response delivery time thresholds to determine the level of restructuring required. In some embodiments, a high level of restructuring (e.g., a restructuring level of "3" in some embodiments) may be require if the estimated response delivery time of the response objects significantly exceeds the one or more response delivery time thresholds. A moderate level of restructuring (e.g., a restructuring level of "2" in some embodiments) may be require if the estimated response delivery time of the response objects moderately exceeds the one or more response delivery time thresholds. And a low level of restructuring (e.g., a restructuring level of "1" in some embodiments) may be require if the estimated response delivery time of the response objects slightly exceeds, or about the same as, the one or more response delivery time thresholds. It is appreciated that the level of restructuring may be accomplished according to any level structure desired.

In some embodiments, for example, a restructuring level 1 may correspond to a desired level of communication channel availability; a restructuring level 2 may correspond to a moderately desired level of communication channel availability; and a restructuring level 3 may corresponds to an undesired level of communication channel availability. In other words, a higher level of restructuring may be required if the communication channel availability, and/or other transmission conditions, are less desirable. A higher level of restructuring may also be required according to any other criteria, such as user preferences or the nature of the request. After determining the level of restructuring, user experience management module 320 may restructure the response according to the nature of request information and/or the level of restructuring. After restructuring the response, user experience management module 320 may provide the restructured response to communication module 312 for scheduling and transmitting the restructured response to client device 110. Exemplary methods of response restructuring are further described in detail below.

Furthermore, in some embodiments, user experience management module 320 may also perform a performance tuning method based on a cumulative restructuring status and a restructuring threshold. A cumulative restructuring status may correspond to, for example, a cumulative count of the restructured responses and/or a cumulative level of the restructured response. In some embodiments, user experience management module 320 can keep track of the cumulative restructuring status. For example, when a response restructuring occurs, user experience management module 320 may increase the cumulative restructuring status. User experience management module 320 may also identify the level (e.g., level 3, level 2, and level 1) of the restructuring and update the cumulative level of the restructured response as well.

Additionally, user experience management module 320 may also obtain a restructuring threshold from configuration module 324. If the cumulative restructuring status exceeds the restructuring threshold, user experience management module 320 may also perform a performance tuning method to update one or more configuration parameters, such as the response delivery time threshold. An exemplary method of performance turning is further described in detail below. User experience management module 320 can be a software program and/or a hardware device.

With reference to FIG. 3, in some embodiments, after communication module 312 transmits the restructured response that is provided by user experience management module 320, record transaction module 322 may obtain information about the completed transmission from communication module 312 and records information (i.e., generates logs) regarding the completed transmission. Such information may include, for example, the receipt of a request and the transmission of the response. Record transaction module 322 may also record one or more of the performance parameters, such as the response delivery time. Record transaction module 322 can be a software program and/or a hardware device.

With reference to FIG. 3, in some embodiments, configuration module 324 may provide the one or more configuration parameters to user experience management module 320. For example, in addition to standard configuration parameters for generating responses, configuration module 324 may also store and provide configuration parameters, such as sample contents of different sizes and types, response delivery time thresholds, mapping between user request parameters and the nature of request, and/or priority information that relates to the entire restructured response and/or portions of the restructured response. In some embodiments, configuration module 324 may also provide configuration parameters to other modules. Moreover, configuration module 324 may also provide an authorized user (e.g., an administrator of server 310) with an interface to perform administration of server 310. Exemplary methods of providing configuration parameters are further described in detail below. Configuration module 324 can be a software program and/or a hardware device.

FIG. 4 is a flow diagram illustrating an exemplary method 400 for optimizing transmission of web content, consistent with some embodiments of the present disclosure. With reference to FIG. 4, in some embodiments, a server (e.g., server 310) may receive a request, such as an HTTP request, to transmit web content (step 402). An HTTP request may include request for accessing particular resources, such as a webpage. As described above, after receiving the HTTP request, the server may obtain information associated with a referral URL using the request.

In some embodiments, using this information associated with a referral URL, the server may determine if any of the previous requests correspond to the current request. If the server determines that one or more previous requests correspond to the current request, the server may determine that one or more response objects corresponding to the current request is not required to be transmitted because they may have already been transmitted in response to the one or more previous requests. Thus, the server may mark the one or more response objects for cancellation of transmission. In some embodiments, by marking the one or more response object for cancellation, the server may not further process the part of the HTTP request that corresponds to the one or more previous requests. For example, the server may process or otherwise transform an HTTP request into a plurality of request objects. If some of the request objects correspond to the one or more previous requests, the server may not further process those request objects.

With reference to FIG. 4, in some embodiments, after receiving the request to transmit web content, the server may identify (step 404), based on the request, a response that includes one or more response objects corresponding to the web content. In identifying the response, the server may analyze the request to extract a URI and/or other useful parameters associated with the request. The server may also map the URI to a resource. For example, the server may associate the URI to a resource, such as a filename, a script for executing, an alias to actual resource, and/or a re-direction target. The server may also map a logical source of the resource to an actual location or path for obtaining that resource.

In some embodiments, in identifying the response, the server may determine authorization of the HTTP request based on credentials associated with the one or more request objects. For example, the server may obtain user credentials or device credentials from the request objects and invoke relevant authentication schemes, such as like Lightweight Directory Access Protocol (LDAP) or windows authentication, to authenticate the user and/or the client device sending the HTTP request. Based on the credentials, the server may determine whether permission should be granted to access the requested resources.

In some embodiments, after determining the authorization of the HTTP request, the server may retrieve the requested web content based on the one or more request objects and/or resource map information. As described above, the server may provide resource map information by mapping the URI to a resource, such as a filename, a script for executing, an alias to actual resource, and/or a re-direction target. The server may use the one or more request objects and/or such resource map information to obtain the requested web content, such as a file, an output of a script, and information from a process, from appropriate sources. As an example, the server may read a file, execute a script, execute a process, and/or make an API call.

Moreover, based on the obtained web content and/or the one or more request objects, the server may also generate one or more response objects, which can be an internal representation of a response. Using the response objects, the server may provide the corresponding response for further restructuring.

Figure 5A:
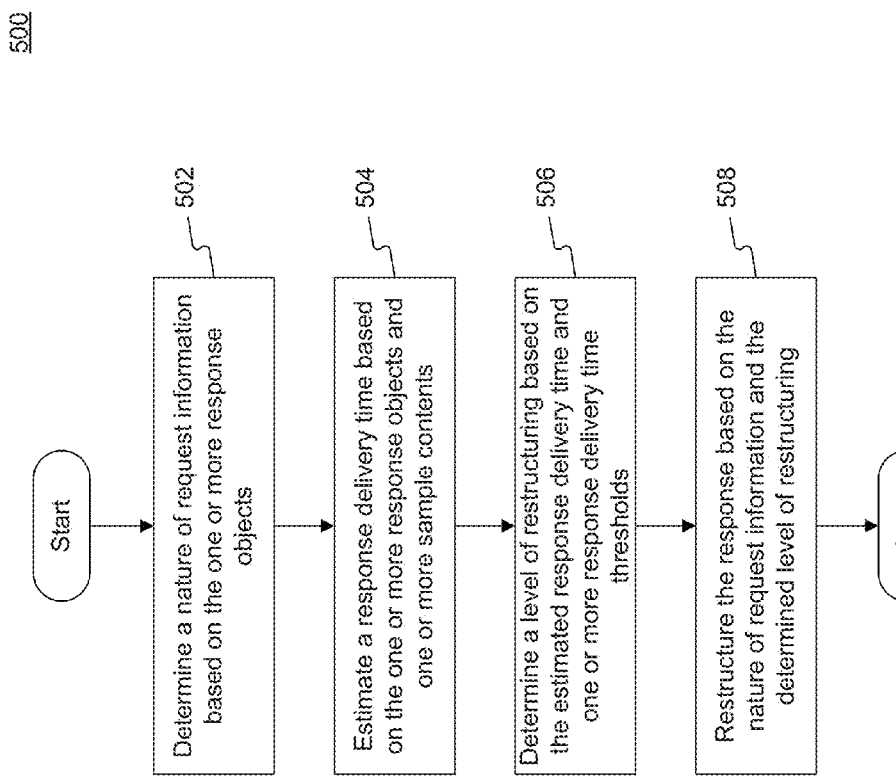
FIG. 5A is a flow diagram illustrating an exemplary method for restructuring a response using response objects and configuration parameters, consistent with some embodiments of the present disclosure.

With reference to FIG. 4, in some embodiments, the server may restructure (step 406) the response using one or more configuration parameters. FIG. 5A is a flow diagram illustrating an exemplary method 500 for restructuring the response using the response objects and/or the configuration parameters. With reference to FIG. 5A, in restructuring the response, for example, the server may determine (step 502) the nature of the request information using the one or more response objects. In some embodiments, for determining the nature of the request information, the server may extract a URI and/or one or more request parameters using the one or more response objects. To obtain the nature of request information, the server may map the extracted URI and/or the one or more request parameters to a database (e.g., a table of the nature of request) provided by, for example, a configuration module (e.g., configuration module 324). The database may be maintained and updated based on the design of website deployed on the server. As an example, based on the mapping, the server may determine that the nature of the request corresponds to a highly important transaction, such as a banking request for balance transfer, or a less important transaction, such as a request for a regular bank statement document.

With reference to FIG. 5A, in restructuring the response, the server may estimate (step 504) a response delivery time based on the one or more response objects and/or one or more sample contents. In some embodiments, for estimating the response delivery time, the server may determine one or more representative content types and one or more representative content sizes based on the one or more response objects. For example, using the response objects, the server may analyze the content types and sizes of various elements within the response objects and obtain the representative types and sizes that are suitable for the current response.

Moreover, for estimating the response delivery time, the server may also obtain the one or more sample contents based on the one or more representative content types and the one or more representative content sizes. Sample contents can have different types and different sizes. For example, a typical joint photographic expert group (jpeg or jpg) file can have a size of 50 bytes, 10 kilobytes, or 250 kilobytes. And a typical cascading style sheets (css) file can have a size of 100 bytes, 50 kilobytes, or 400 kilobytes. Using webserver log files or any other available resources, the server can extract a list of webpages and/or contents that are frequently requested by client devices and the frequency distribution with respect to the content elements delivered, the types and quantities of the content elements, and the sizes of the content elements. For example, the server may determine that the type of content elements that is most often requested includes jpg files, css files, and hypertext markup language (html) files. The server may also determine, for example, that the most often requested content elements have sizes of 10 kilobytes and 100 kilobytes.

Furthermore, after extracting a list of webpages and/or contents that are frequently requested by the client devices and the corresponding frequency distribution, the server may select a list of representative contents that have representative content types and representative content sizes. The server may select such list corresponding to a plurality of milestone sizes. For example, using the frequency distribution, the server may use a first quartile (e.g., 25th percentile of data), a second quartile (e.g., a 50th percentile of data), and a third quartile (e.g., a 75th percentile of data) as a guideline to select the representative content types and representative content sizes. In some embodiments, the representative content types and the representative content size may be updated based on changes in the deployment on the server or a periodic review of the frequency distribution.

With reference to FIG. 5A, for estimating the response delivery time, the server may also transmit one or more synthetic responses that include the one or more sample contents and estimate the response delivery time based on time for transmitting the one or more synthetic responses. For example, the server can prepare one or more synthetic responses for transmitting to the client device. The synthetic responses may include one or more of the sample contents that have representative content types and representative content sizes. The server may then transmit the synthetic responses to the client device, directly or indirectly, over any available communication channel. The server may then estimate the time for transmitting the sample contents to a particular client device based on, for example, the acknowledgement of transmission received.

In some embodiments, based on the time for transmitting the sample contents, the server may estimate the response delivery time for transmitting the actual content requested by the client device. For example, the server may compare the content types and sizes of the one or more response objects to be transmitted to the client device with the sample contents. Based on the comparison and the estimated time for transmitting the sample contents, the server may estimate how much time it would take to transmit the one or more response objects.

With reference to FIG. 5A, in some embodiments, the server may determine (step 506) a level of restructuring based on the estimated response delivery time and one or more response delivery time thresholds. For example, the server may compare the estimated response delivery time of the response objects with the one or more response delivery time thresholds to determine the level of restructuring required. In some embodiments, a high level of restructuring (e.g., a restructuring of level 3) may be required if the estimated response delivery time of the response objects significantly exceeds the one or more response delivery time thresholds. A moderate level of restructuring (e.g., a restructuring level of 2) may be required if the estimated response delivery time of the response objects moderately exceeds the one or more response delivery time thresholds. And a low level of restructuring (e.g., a restructuring level of 1) may be required if the estimated response delivery time of the response objects slightly exceeds, or about the same as, the one or more response delivery time thresholds. It is appreciated that the level of restructuring may be any level that is desired. In some embodiments, for example, a restructuring level 1 may correspond to a desired level of communication channel availability; a restructuring level 2 may correspond to a moderately desired level of communication channel availability; and a restructuring level 3 may correspond to an undesired level of communication channel availability.

In some embodiments, the server may obtain the one or more response delivery time thresholds from a configuration module (e.g., configuration module 324). For example, the configuration module may provide that a response delivery time threshold of 3 seconds or lower corresponds to the restructuring level 1; a response delivery time threshold between 3 seconds and 8 seconds corresponds to the restructuring level 2; and a response delivery time thresholds of 8 seconds or higher corresponds to the restructuring level 3. It is appreciated that any response delivery time thresholds can be provided.

In some embodiments, for configuring the response delivery time thresholds, the server can estimate the response delivery times corresponding to a list of webpages and/or contents that are often requested by client devices and obtain the frequency distribution of the response delivery time and the number of the responses corresponding to the response delivery time. For example, the server can estimate that the numbers of responses that correspond to response delivery times of 1-2 seconds, 2-3 second, etc., and above, for example, 10 seconds. The server can estimate the response delivery times and the corresponding number of responses using the webserver log files or any other available resources.

Furthermore, after estimating the response delivery times and obtaining the frequency distribution, the server may select a list of response delivery time thresholds corresponding to a plurality of milestone response delivery times. For example, using the frequency distribution, the server may select a first response delivery time threshold corresponding to 40th percentile of data, a second response delivery time threshold corresponding to a 70th percentile of data, etc. In some embodiments, for example, the first response delivery time threshold (40th percentile of data) may correspond to a fast response delivery time and the second response delivery time threshold (70th percentile of data) may correspond to a moderate response delivery time.

In some embodiments, the response delivery time thresholds may also be selected based on business requirements, user preferences, and/or any other criteria. The response delivery time threshold may also be updated based on changes in the deployment on the server or a periodic review of the frequency distribution. In some embodiments, the server may update the response delivery time thresholds when the server performs a performance tuning. The performance tuning is described further in detail below.

With reference to FIG. 5A, after determining the level of restructuring, the server may restructure (step 508) the response based on the nature of request information and/or the level of restructuring. FIG. 5B is a flow diagram illustrating an exemplary method 540 for restructuring the response based on the nature of request information and/or the level of restructuring. With reference to FIG. 5B, in some embodiments, the server may identify (step 542) response chunk information and response chunk priority information, based on the nature of request information. As described above, the server may provide one or more response objects as the internal representation of a response. A response object may include one or more response chunks. A response chunk may correspond to a specific content type, such a pdf file that contains a bank statement.

In some embodiments, the server may obtain the response chunk information and the associated priority information provided by a configuration module (e.g., configuration module 324). The response chunk information and associated priority information may be pre-configured by the server. Depending on the nature of the request, the server may thus obtain the pre-configured response chunk information corresponding to the nature of the request. For example, the nature of the request may indicate that it requires one or more response chunks corresponding to an online banking transaction document, a regular banking statement, an image file, etc., to satisfy the request. Moreover, the server may also obtain the priority information associated with the response chunk information. For example, if the response chunk information indicates a banking transaction document is required, the associated priority may be 2; and if a regular bank statement is required, the associated priority may be 5.It is appreciated that any desired priority can be included in the associated response chunk information.

As described above, after receiving the request, the server may provide one or more response objects as the internal representation of the response. With reference to FIG. 5B, in some embodiments, the server may determine (step 544) the one or more sizes and/or the one or more priorities associated with the one or more response chunks, based on the response chunk information and the associated priority information. In such determination, the server may identify the one or more response chunks in the one or more response objects using the response chunk information. For example, the server may identify that one response chunk corresponds to a requested banking transaction document, another response chunk corresponds to a requested bank statement, another response chunk corresponds to a requested image file, etc. The server may also assign, based on the response chunk priority information, one or more priorities to the one or more response chunks. For example, using the response chunk priority information, the server may assign the response chunk corresponding to a banking transaction document to have a priority of 2, and assign the response chunk corresponding to a pdf file containing a regular bank statement a priority of 5. In some embodiments, a priority may be higher if its assigned number is smaller. Thus, a priority of 2 may indicate a higher priority than a priority of 5.

Moreover, in some embodiments, the server may also determine, one or more sizes associated with the one or more response chunks based on the one or more sample contents. As described above, the server may obtain sample contents for estimating a response delivery time. The server can also use the sample contents, which include representative content sizes of a plurality of representative content types, to determine sizes of the response chunks. For example, the server may compare a particular response chunk with a same type sample content that has a known size and determine what the size of the response chunk is.

With reference to FIG. 5B, in some embodiments, after determining the one or more sizes and the one or more priorities associated with the one or more response chunks, the server may provide (step 546) at least one response set that includes the one or more response objects. The server may also associate (step 548) one or more priorities to the one or more response objects based on the one or more sizes and/or the one or more priorities associated with the one or more response chunks. As described above, the server may assign priorities to the one or more response chunks. In some embodiments, the server may combine one or more of the response chunks to generate a response object. A response object may thus include response chunks having the same or different priorities. As an example, a response object may include two response chunks that both are assigned a priority of 2, and thus the response object may also be assigned a priority of 2. As another example, a response object may include two response chunks, with one response chunk assigned priority of 2 and the other assigned priority of 5. The server may assign a higher priority (e.g., a priority of 2) to the response object that includes the two response chunks of differing priorities. It is appreciated, however, that the server can assign priority to response objects that combine two or more response chunks in any manner that is desired.

Figure 6A:
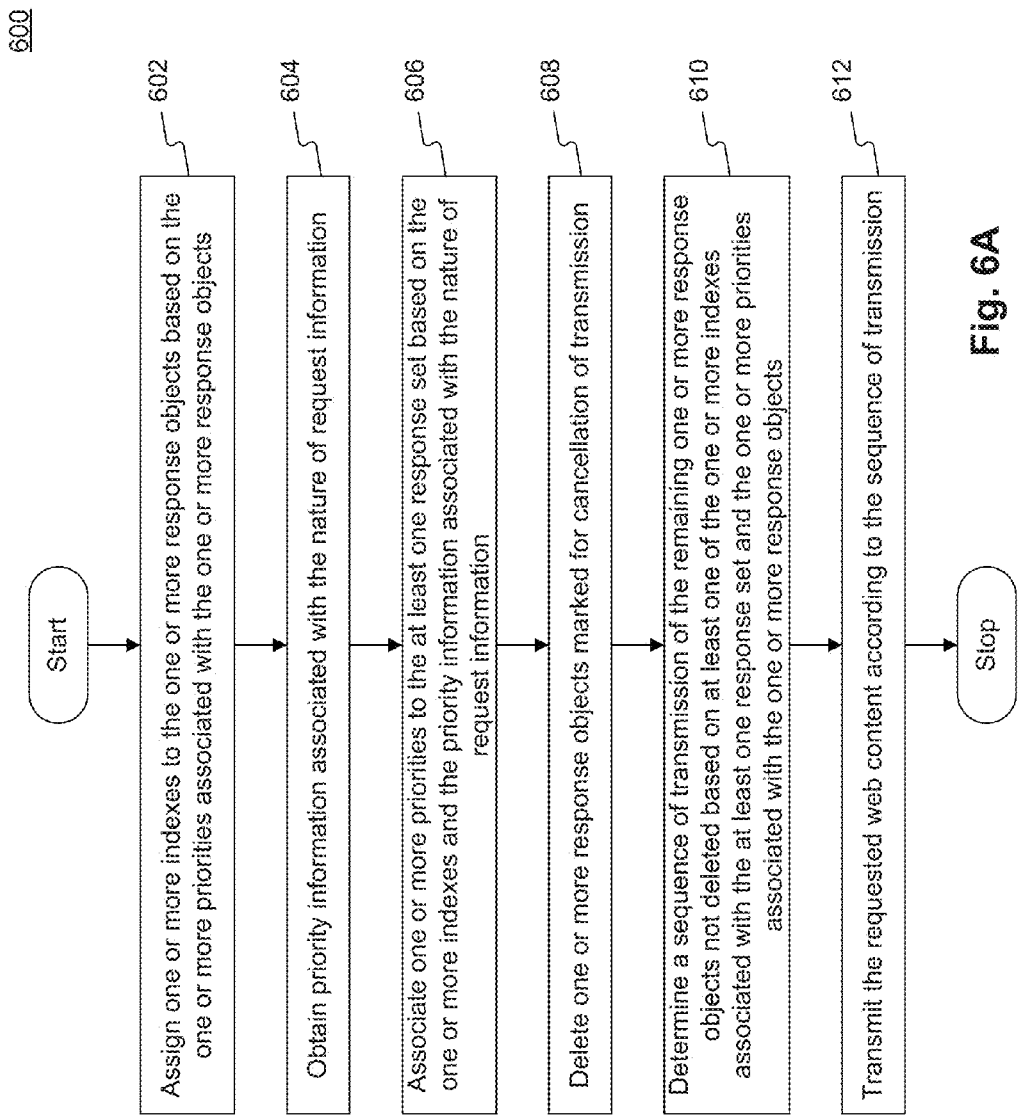
FIG. 6A is a flow diagram illustrating an exemplary method for scheduling the restructured response and transmitting the requested web content according to the scheduled restructured response, consistent with some embodiments of the present disclosure.

With reference to FIG. 4, in some embodiments, after restructuring the response, which includes the one or more prioritized response objects, the server may schedule (step 408) the restructured response and transmit (step 410) the requested web content according to the scheduled restructured response. FIG. 6A is a flow diagram illustrating an exemplary method 600 for scheduling the restructured response and transmitting the requested web content according to the scheduled restructured response. With reference to FIG. 6A, for scheduling the restructured response, the server may assign (step 602) one or more indexes to the one or more response objects based on the one or more priorities associated with the one or more response objects. As described above, the one or more response objects are assigned their priorities by the server. Moreover, the server may combine one or more response objects to generate a response set. In some embodiments, the response objects in any response set may be sorted in the order of their assigned priorities and sizes. For example, the server may sort the response objects in a particular response set first according to their priorities and then according their sizes if any two or more response objects have the same priority.

In some embodiments, after sorting the response objects in a response set, the server may assign an index to each of the sorted response objects. The indexes may serve as modified priorities for the sorted response objects. Moreover, in some embodiments, the server may also associate a timestamp to each of the one or more response sets. For example, the timestamp can be a timestamp of the time when the server associates it to the response set.

With reference to FIG. 6A, in some embodiments, the server may obtain (step 604) priority information associated with the nature of request and/or request parameter information. In some embodiments, the priority information may be pre-configured and provided by a configuration module. For example, depending on business requirement or user preferences, a high priority may be associated with a particular nature of request information, such as information regarding request for an online banking transaction.

Figure 6B:
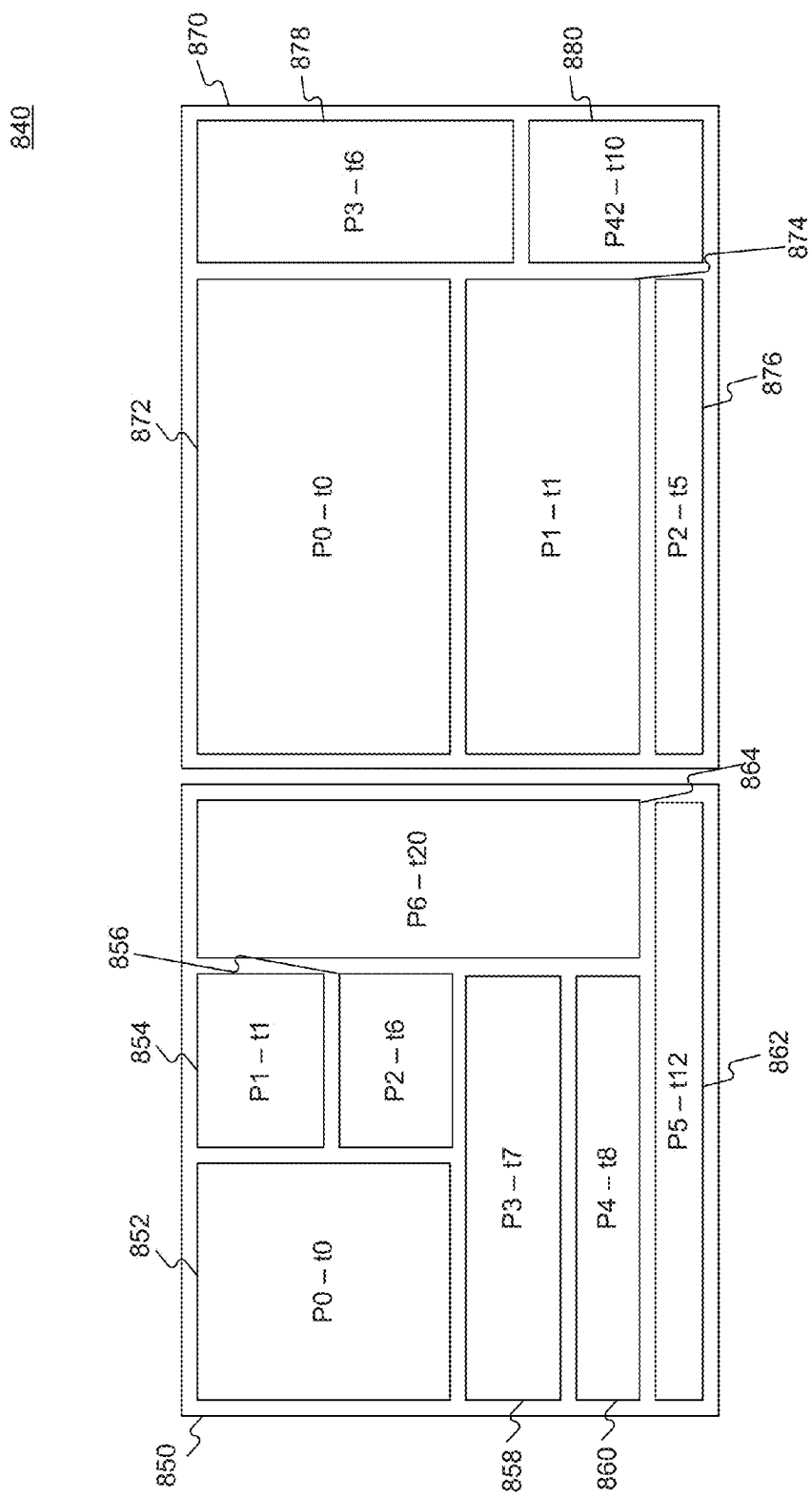
FIG. 6B is a block diagram illustrating the elements and the exemplary varieties of delivery manners in the restructuring of a response of a webpage, consistent with some embodiments of the present disclosure.

In some embodiments, after obtaining the priority information associated with the nature of request and/or request parameter information, the server may associate (step 606) one or more priorities to the at least one response set using the priority information associated with the nature of request information. Therefore, in some embodiments, a response set may be associated with a priority. A response set may also be associated with a timestamp. As an example, FIG. 6B is a block diagram illustrating response sets of a restructured response 840. Response 840 may be structured in any number of manners. For example, FIG. 6B illustrates that response 840 may have two different structures 850 and 870. For illustration purposes, the two structures 850 and 870 may have the same aggregated web content in response to an HTTP request. The aggregated web content of structures 850 and 870 may be transmitted to the same user at different times or to different users at the same time.

As shown in FIG. 6B, in structure 850, aggregated web content in response to the corresponding HTTP request may include one or more response sets, such as 852, 854, 856, 858, 860, 862, and 864. In structure 870, aggregated web content in response to the corresponding HTTP request may include one or more response sets, such as 872, 874, 876, 878, and 880. The one or more response sets may be assigned different priorities and timestamps. For example, as shown in FIG. 6B, response sets 852 and 872 are both assigned priority 0 and timestamp 0 (i.e., P0 -t0). Similarly, response sets 854 and 874 are both assigned P1-t1; response set 856 is assigned P2-t6; response set 876 is assigned P2-t5; response set 858 is assigned P3-t7; response set 878 is assigned P3-t6; response set 860 is assigned P4-t8; response set 880 is assigned P4-t10; and response set 862 is assigned P5-t12.

In addition to being assigned different priorities and/or different timestamps, the response sets may have different sizes (indicated in FIG. 6B by total area of the response set). Thus, the restructured response may enable transmitting the response objects contained in the response sets according to the priorities, timestamps, and sizes of their associated response sets. The transmitting of the response can therefore be customized across users, webpage requests, and time points. In other words, a same webpage content may be transmitted in different manner across users and time points. Further, the same user may also receive a different transmitting sequence of the response sets at different time points. Accordingly, the transmission of the web contents can be customized to enhance user experience and to satisfy business requirements. Details of the transmission of the response objects are further described below.

With reference to FIG. 6A, in some embodiments, in transmitting the requested web content according to the scheduled restructured response, the server may delete (step 608) one or more response objects that are marked for cancellation of transmission. As described above, the server may mark one or more response objects for cancellation if it determines that one or more previous requests were received corresponding to the current request.

With reference to FIG. 6A, in some embodiments, in transmitting the requested web content according to the scheduled restructured response, the server may determine (step 610) the sequence of transmission of the remaining one or more response objects based on the one or more priorities associated with the at least one response set, the one or more indexes associated with the one or more response objects, and/or the timestamps associated with the at least one response set. As an example, the server may sort the response objects across response sets in the order of priority associated with the response sets, the index associated with the one or more response objects, and/or the timestamps of the response sets. For example, with reference to FIG. 6B, after sorting, all response objects contained in response sets 852 and 872 may be scheduled for delivery before the other response sets because response sets 852 and 872 have the first priority and first timestamp (e.g., P0-t0). Furthermore, within response sets 852 and 872, the response objects are further assigned indexes according to the priorities associated with the response objects.

With reference to FIG. 6A, after determining the sequence of transmission of the response objects, the server may transmit (step 612) the requested web content to the client devices according to the sequence (e.g., the assigned indexes) of the response objects. The server may transmit the web content directly or indirectly to the client devices.

Figure 7A:
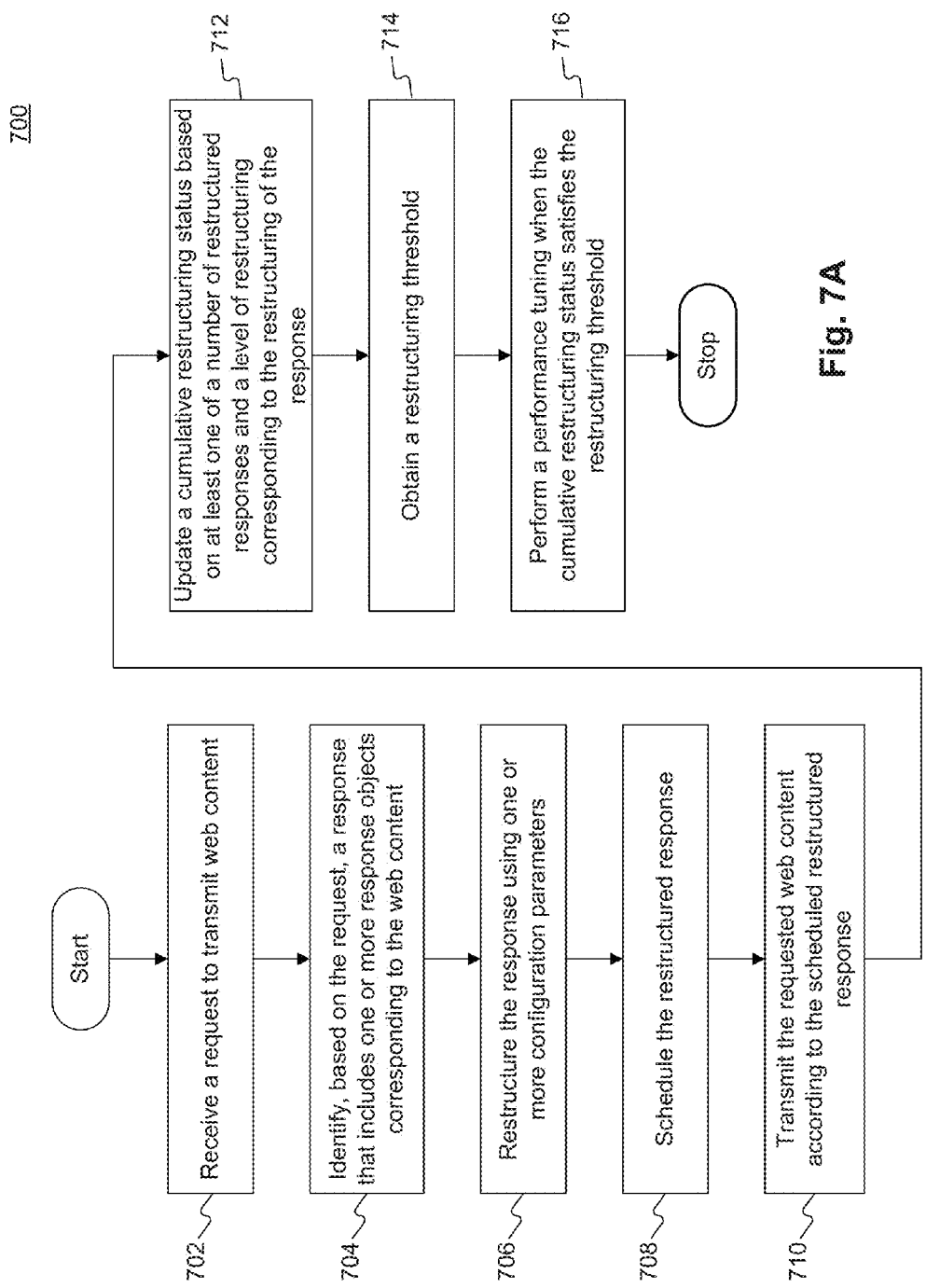
FIG. 7A is a flow diagram illustrating an exemplary method for optimizing transmission of web content and determining for performance tuning, consistent with some embodiments of the present disclosure.

FIG. 7A is a flow diagram illustrating an exemplary method 700 for optimizing web content transmission and performance tuning. With reference to FIG. 7A, in some embodiments, a server (e.g., server 310) may receive (step 702) a request to transmit web content; identify (step 704), based on the request, a response that includes one or more response objects corresponding to the web content; restructure (step 706) the response using one or more configuration parameters; schedule (step 708) the restructured response; and transmit (step 710) the requested web content according to the scheduled restructured response. Steps 702, 704, 706, 708, and 710 may be the same or substantially the same as steps 402, 404, 406, 408, and 410 as described above, and thus details associated with the steps are not repeated.

With reference to FIG. 7A, in some embodiments, after transmitting the restructured response, the server may update (step 712) a cumulative restructuring status. The cumulative restructuring status may be based on a number of restructured responses and/or a cumulative level of restructuring corresponding to the restructuring of the response. For example, after transmitting each restructured response, the server may increase the number of restructured response by "1." In some embodiments, the server may also track the level of the restructured response. For example, the server may increase the number of level 1 restructured response by "1" after transmitting such a response. Accordingly, the server may keep track of number and/or percentage of restructured responses corresponding to each level of restructuring.

With reference to FIG. 7A, in some embodiments, the server may obtain (step 714) a restructuring threshold from a configuration module and perform (step 716) a performance tuning, if the cumulative restructuring status satisfies the restructuring threshold. For example, when the number of requests served by the server exceeds a preconfigured threshold (e.g., 1 million) and the number and/or percentage of restructured responses falls below a preconfigured value (e.g., level 2 restructuring falls below 30%), the performance of server may be tuned. It is appreciated that the performance tuning may also be triggered in any other manner that is desired.

The restructuring threshold may be configured by the server to increase or reduce the number of restructuring responses to satisfy business requirements or user preferences. For example, the restructuring threshold may be configured such that the server may transmit a required percentage of responses within a target response delivery time. In some embodiments, the webserver log files and/or other available sources may be used to estimate the distribution of the response delivery times for the requests served by the server in a certain period of time, such as a day, week, month, etc. The restructuring threshold may thus be configured or reconfigured based on the distribution of the response delivery times and the target response delivery time.

Figure 7B:
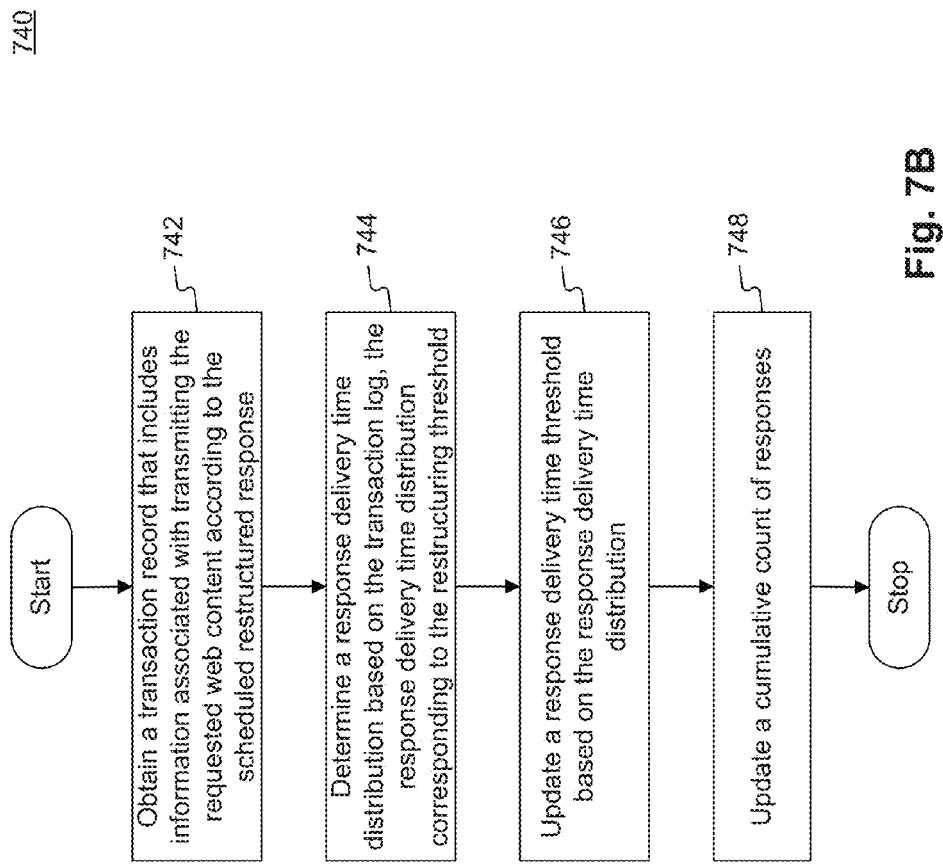
FIG. 7B is a flow diagram illustrating an exemplary method for performing a performance tuning, consistent with some embodiments of the present disclosure.

FIG. 7B is a flow diagram illustrating an exemplary method 740 for performing a performance tuning. With reference to FIG. 7B, in some embodiments, the server may access, receive, or otherwise obtain (step 742) a transaction record, such as a log, that includes information associated with transmitting of the requested web content according to the scheduled restructured response. Using the transaction log, the server may determine (step 744) a response delivery time distribution corresponding to the restructuring threshold. For example, the server may estimate what value of the response delivery time (e.g., 5 seconds) corresponds to a particular percentage (e.g., 40%) of the response delivery time distribution chart. Based on the response delivery time distribution, the server may update (step 746) a response delivery time threshold. For example, to satisfy the requirement that a certain percentage of the response be delivered within a target response delivery time, the server may reduce the response delivery time threshold (e.g., from 5 seconds to 4 seconds). By reducing the response delivery time threshold, more responses may be restructured.

With reference to FIG. 7B, in some embodiments, the server may also update (step 748) a cumulative count of responses after updating the response delivery time threshold. For example, after updating the response delivery time threshold, the cumulative count of responses may be reset to "0" so that a new cumulative count can be obtained.

The specification has described systems and methods for optimizing web content transmission. The illustrated steps are set out to explain the exemplary embodiments shown, and it should be anticipated that ongoing technological development will change the manner in which particular functions are performed. These examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for optimizing transmission of web content, comprising: one or more hardware processors; and a memory storing processor-executable instructions that, when executed by the one or more hardware processors, perform operations comprising:
    receiving a request to transmit web content;
    identifying, based on the request, a response that includes one or more response objects corresponding to the web content;
    restructuring the response based on the one or more response objects and one or more configuration parameters, wherein restructuring the response based on the one or more response objects and the one or more configuration parameters comprises:
        determining a nature of request information based on the one or more response objects;
        estimating a response delivery time based on the one or more response objects and one or more sample contents;
        determining one or more levels of restructuring based on the estimated response delivery time and one or more response delivery time thresholds; and
        restructuring the response based on the nature of request information and the determined one or more levels of restructuring;
    scheduling the restructured response; and
    transmitting the requested web content according to the scheduled restructured response.

2. The system of claim 1, wherein the system comprises at least one of:
    a mobile device, a computer, or a server.

3. The system of claim 1, wherein receiving the request to transmit the web content comprises:
    identifying, based on the request, information associated with a uniform resource locator (URL);
    determining whether one or more other received requests corresponding to the request, the one or more other received requests including one or more other response objects; and
    marking, based on the determination, the one or more other response objects for cancellation of transmission.

4. The system of claim 1, wherein identifying the response that includes one or more response objects comprises:
    analyzing the request to extract a uniform resource identifier, the request including one or more request objects;
    determining authorization of the request based on user credentials associated with the one or more request objects;
    authenticating the request using one or more authentication schemes;
    retrieving the web content based on the one or more request objects and resource map information; and
    providing the response using the obtained web content and the one or more request objects.

5. The system of claim 1, wherein determining the nature of request information comprises:
    determining, based on the one or more response objects, a uniform resource identifier and one or more request parameters; and
    identifying the nature of request information based on the uniform resource identifier and the one or more request parameters.

6. The system of claim 1, wherein estimating the response delivery time based on the one or more response objects and the one or more sample contents comprises:
    determining, based on the one or more response objects, one or more representative content types and one or more representative content sizes;
    generating the one or more sample contents based on the one or more representative content types and the one or more representative content sizes;
    transmitting one or more synthetic responses that include the one or more sample contents; and
    estimating the response delivery time based on a time for transmitting the one or more synthetic responses.

7. The system of claim 1, wherein determining the level of restructuring based on the estimated response delivery time and the one or more response delivery time thresholds comprises:
    comparing the estimated response delivery time with the one or more response delivery time thresholds; and
    determining the level of restructuring based on the comparison.

8. The system of claim 1, wherein restructuring the response based on the nature of request information and the level of restructuring comprises:
    identifying, based on the nature of request information, response chunk information and response chunk priority information associated with one or more response chunks;
    determining one or more sizes and one or more priorities associated with the one or more response chunks based on the response chunk information and response chunk priority information;
    providing at least one response set that includes the one or more response objects, the one or more response objects corresponding to the one or more response chunks; and
    associating one or more priorities to the one or more response objects based on the one or more sizes and the one or more priorities associated with the one or more response chunks.

9. The system of claim 8, wherein determining the one or more sizes and the one or more priorities associated with the one or more response chunks comprises:
    identifying the one or more response chunks using the response chunk information, the one or more response chunks corresponding to the requested web content;
    assigning, based on the response chunk priority information, the one or more priorities associated with the one or more response chunks; and
    determining, based on the one or more sample contents, the one or more sizes associated with the one or more response chunks.

10. The system of claim 8, wherein scheduling of the restructured response comprises:
   assigning one or more indexes to the one or more response objects based on the one or more priorities associated with the one or more response objects;
   obtaining priority information associated with the nature of request information; and associating one or more priorities to the at least one response set based on the priority information associated with the nature of request information.

11. The system of claim 10, wherein transmitting the requested web content according to the scheduled restructured response comprises:
   deleting one or more response objects marked for cancellation of transmission;
   determining a sequence of transmission of the remaining one or more response objects not deleted based on at least one of the one or more priorities associated with the at least one response set, the one or more indexes associated with the one or more response objects, and timestamps associated with the at least one response set; and transmitting the requested web content according to the sequence of transmission of the remaining one or more response objects.

12. The system of claim 1, the instructions further comprising instructions for: providing a transaction log that includes information associated with transmitting the requested web content.

13. The system of claim 1, the instructions further comprising instructions for:
   updating a cumulative restructuring status based on at least one of a number of restructured responses and a cumulative level of restructuring corresponding to the restructuring of the response; obtaining a restructuring threshold; and
   performing a performance tuning when the cumulative restructuring status satisfies the restructuring threshold.

14. The system of claim 13, wherein performing the performance tuning comprises:
   obtaining a transaction record that includes information associated with transmitting the requested web content according to the scheduled restructured response;
   determining a response delivery time distribution based on the transaction log, the response delivery time distribution corresponding to the restructuring threshold; and
   updating a response delivery time threshold based on the response delivery time distribution; and updating a cumulative count of responses.

15. A web content transmission optimization method, comprising:
   receiving a request to transmit web content;
   identifying, based on the request, a response that includes one or more response objects corresponding to the web content;
   restructuring the response based on the one or more response objects and one or more configuration parameters, wherein restructuring the response based on the one or more response objects and the one or more configuration parameters comprises;
   determining a nature of request information based on the one or more response objects;
   estimating a response delivery time based on the one or more response objects and one or more sample contents;
   determining one or more levels of restructuring based on the estimated response delivery time and one or more response delivery time thresholds; and
   restructuring the response based on the nature of request information and the determined one or more levels of restructuring;
   scheduling the restructured response; and
   transmitting the requested web content according to the scheduled restructured response.

16. The method of claim 15, wherein receiving the request to transmit the web content comprises:
   identifying, based on the request, information associated with a uniform resource locator (URL);
   determining whether one or more other received requests corresponding to the request, the one or more other received requests including one or more other response objects; and
   marking, based on the determination, the one or more other response objects for cancellation of transmission.

17. The method of claim 15, wherein identifying the response that includes one or more response objects comprises:
   analyzing the request to extract a uniform resource identifier, the request including one or more request objects;
   determining authorization of the request based on user credentials associated with the one or more request objects;
   authenticating the request using one or more authentication schemes;
   retrieving the web content based on the one or more request objects and resource map information; and
   providing the response using the obtained web content and the one or more request objects.

18. The method of claim 15, wherein determining the nature of request information comprises:
   determining, based on the one or more response objects, a uniform resource identifier and one or more request parameters; and
   identifying the nature of request information based on the uniform resource identifier and the one or more request parameters.

19. The method of claim 15, wherein estimating the response delivery time based on the one or more response objects and the one or more sample contents comprises:
   determining, based on the one or more response objects, one or more representative content types and one or more representative content sizes;
   identifying the one or more sample contents based on the one or more representative content types and the one or more representative content sizes;
   transmitting one or more synthetic responses that include the one or more sample contents; and
   estimating the response delivery time based on a time for transmitting the one or more synthetic responses.

20. The method of claim 15, wherein determining the level of restructuring based on the estimated response delivery time and the one or more response delivery time thresholds comprises:
   comparing the estimated response delivery time with the one or more response delivery time thresholds; and
   determining the level of restructuring based on the comparison.

21. The method of claim 15, wherein restructuring the response based on the nature of request information and the level of restructuring comprises:

identifying, based on the nature of request information, response chunk information and response chunk priority information associated with one or more response chunks;

determining one or more sizes and one or more priorities associated with the one or more response chunks based on the response chunk information and response chunk priority information;

providing at least one response set that includes the one or more response objects, the one or more response objects corresponding to the one or more response chunks; and associating one or more priorities to the one or more response objects based on the one or more sizes and the one or more priorities associated with the one or more response chunks.

22. The method of claim 21, wherein determining the one or more sizes and the one or more priorities associated with the one or more response chunks comprises:

identifying the one or more response chunks using the response chunk information, the one or more response chunks corresponding to the requested web content;

assigning, based on the response chunk priority information, the one or more priorities associated with the one or more response chunks; and determining, based on the one or more sample contents, the one or more sizes associated with the one or more response chunks.

23. The method of claim 21, wherein scheduling of the restructured response comprises:

assigning one or more indexes to the one or more response objects based on the one or more priorities associated with the one or more response objects;

obtaining priority information associated with the nature of request information; and associating one or more priorities to the at least one response set based on the priority information associated with the nature of request information.

24. The method of claim 23, wherein transmitting the requested web content according to the scheduled restructured response comprises:

deleting one or more response objects that are marked for cancellation of transmission;

determining a sequence of transmission of the remaining one or more response objects not deleted based on at least one of the one or more priorities associated with the at least one response set, the one or more indexes associated with the one or more response objects, and timestamps associated with the at least one response set; and transmitting the requested web content according to the sequence of transmission of the remaining one or more response objects.

25. The method of claim 15, further comprising: providing a transaction log that includes information associated with transmitting the requested web content.

26. The method of claim 15, further comprising:

updating a cumulative restructuring status based on at least one of a number of restructured responses and a cumulative level of restructuring corresponding to the restructuring of the response;

obtaining a restructuring threshold; and performing a performance tuning when the cumulative restructuring status satisfies the restructuring threshold.

27. The method of claim 26, wherein performing the performance tuning comprises:

obtaining a transaction record that includes information associated with transmitting the requested web content according to the scheduled restructured response;

determining a response delivery time distribution based on the transaction log, the response delivery time distribution corresponding to the restructuring threshold; and updating a response delivery time threshold based on the response delivery time distribution; and updating a cumulative count of responses.

28. A non-transitory computer-readable medium storing computer-executable web content transmission optimization instructions that, when executed by a processor, cause the processor to perform operations comprising:

receiving a request to transmit web content;

identifying, based on the request, a response that includes one or more response objects corresponding to the web content;

restructuring the response based on the one or more response objects and one or more configuration parameters, wherein restructuring the response based on the one or more response objects and the one or more configuration parameters comprises;

determining a nature of request information based on the one or more response objects;

estimating a response delivery time based on the one or more response objects and one or more sample contents;

determining one or more levels of restructuring based on the estimated response delivery time and one or more response delivery time thresholds; and restructuring the response based on the nature of request information and the determined one or more levels of restructuring;

scheduling the restructured response; and transmitting the requested web content according to the scheduled restructured response.

29. The medium of claim 28, wherein receiving the request to transmit the web content comprises: identifying, based on the request, information associated with a uniform resource locator (URL);

determining whether one or more other received requests corresponding to the request, the one or more other received requests including one or more other response objects; and marking, based on the determination, the one or more other response objects for cancellation of transmission.

30. The medium of claim 28, wherein identifying the response that includes one or more response objects comprises:

analyzing the request to extract a uniform resource identifier, the request including one or more request objects;

determining authorization of the request based on user credentials associated with the one or more request objects;

authenticating the request using one or more authentication schemes; retrieving the web content based on the one or more request objects and resource map information; and providing the response using the obtained web content and the one or more request objects.

31. The medium of claim 28, wherein determining the nature of request information comprises:

determining, based on the one or more response objects, a uniform resource identifier and one or more request parameters; and identifying the nature of request information based on the uniform resource identifier and the one or more request parameters.

32. The medium of claim 28, wherein estimating the response delivery time based on the one or more response objects and the one or more sample contents comprises:
  determining, based on the one or more response objects, one or more representative content types and one or more representative content sizes;
  generating the one or more sample contents based on the one or more representative content types and the one or more representative content sizes;
  transmitting one or more synthetic responses that include the one or more sample contents; and
  estimating the response delivery time based on a time for transmitting the one or more synthetic responses.

33. The medium of claim 28, wherein determining the level of restructuring based on the estimated response delivery time and the one or more response delivery time thresholds comprises:
  comparing the estimated response delivery time with the one or more response delivery time thresholds; and
  determining the level of restructuring based on the comparison.

34. The medium of claim 28, wherein restructuring the response based on the nature of request information and the level of restructuring comprises:
  identifying, based on the nature of request information, response chunk information and response chunk priority information associated with one or more response chunks;
  determining one or more sizes and one or more priorities associated with the one or more response chunks based on the response chunk information and response chunk priority information;
  providing at least one response set that includes the one or more response objects, the one or more response objects corresponding to the one or more response chunks; and
  associating one or more priorities to the one or more response objects based on the one or more sizes and the one or more priorities associated with the one or more response chunks.

35. The medium of claim 34, wherein determining the one or more sizes and the one or more priorities associated with the one or more response chunks comprises:
  identifying the one or more response chunks using the response chunk information, the one or more response chunks corresponding to the requested web content;
  assigning, based on the response chunk priority information, the one or more priorities associated with the one or more response chunks; and
  determining, based on the one or more sample contents, the one or more sizes associated with the one or more response chunks.

36. The medium of claim 34, wherein scheduling of the restructured response comprises:
  assigning one or more indexes to the one or more response objects based on the one or more priorities associated with the one or more response objects;
  obtaining priority information associated with the nature of request information; and associating one or more priorities to the at least one response set based on the priority information associated with the nature of request information.

37. The medium of claim 36, wherein transmitting the requested web content according to the scheduled restructured response comprises:
  deleting one or more response objects marked for cancellation of transmission;
  determining a sequence of transmission of the remaining one or more response objects not deleted based on at least one of the one or more priorities associated with the at least one response set, the one or more indexes associated with the one or more response objects, and timestamps associated with the at least one response set;
  and transmitting the requested web content according to the sequence of transmission of the remaining one or more response objects.

38. The medium of claim 28, further comprising:
  providing a transaction log that includes information associated with transmitting the requested web content.

39. The medium of claim 28, further comprising: updating a cumulative restructuring status based on at least one of a number of restructured responses and a cumulative level of restructuring corresponding to the restructuring of the response;
  obtaining a restructuring threshold; and
  performing a performance tuning when the cumulative restructuring status satisfies the restructuring threshold.

40. The medium of claim 39, wherein performing the performance tuning comprises:
  obtaining a transaction record that includes information associated with transmitting the requested web content according to the scheduled restructured response;
  determining a response delivery time distribution based on the transaction log, the response delivery time distribution corresponding to the restructuring threshold; and
  updating a response delivery time threshold based on the response delivery time distribution; and updating a cumulative count of responses.

* * * * *

UNITED STATES PATENT AND TRADEMARK OFFICE
CERTIFICATE OF CORRECTION

| | |
|---|---|
| PATENT NO. | : 9,450,824 B2 |
| APPLICATION NO. | : 14/229797 |
| DATED | : September 20, 2016 |
| INVENTOR(S) | : Abhijit Shrikant Ranjekar |

It is certified that error appears in the above-identified patent and that said Letters Patent is hereby corrected as shown below:

In the Claims

In Claim 1, Column 19, Line 33, "comprises;"
should read --comprises:--.

In Claim 3, Column 19, Line 56, "corresponding to the request,"
should read --correspond to the request,--.

In Claim 15, Column 21, Line 62, "comprises;"
should read --comprises:--.

In Claim 16, Column 22, Line 16, "corresponding to the request,"
should read --correspond to the request,--.

In Claim 28, Column 24, Line 24, "comprises;"
should read --comprises:--.

In Claim 29, Column 24, Line 44, "corresponding to the request,"
should read --correspond to the request,--.

Signed and Sealed this
Third Day of January, 2017

Michelle K. Lee
*Director of the United States Patent and Trademark Office*